J. R. HENSLEY.
FUEL MIXER.
APPLICATION FILED AUG. 28, 1919.
1,333,978.
Patented Mar. 16, 1920.
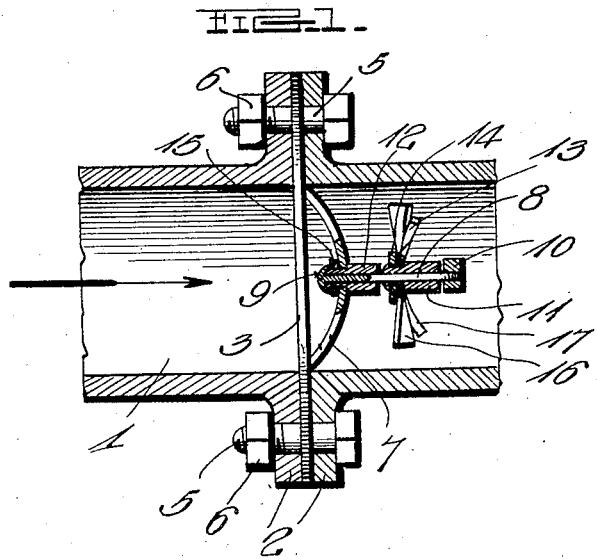
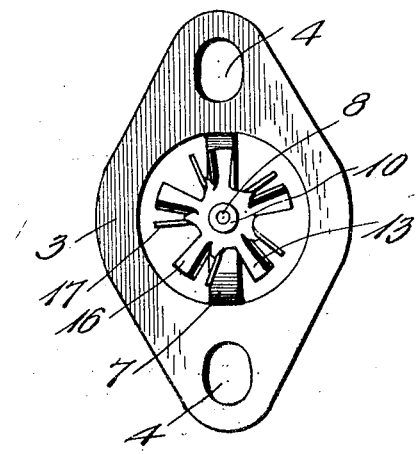
Witness
George W. Giovannetti
Inventor
J. R. Hensley
By H. B. Wilson & Co.
Attorneys

UNITED STATES PATENT OFFICE.

JAMES ROBERT HENSLEY, OF PORTLAND, OREGON.

FUEL-MIXER.

1,333,978. Specification of Letters Patent. Patented Mar. 16, 1920.

Application filed August 28, 1919. Serial No. 320,353.

*To all whom it may concern:*

Be it known that I, JAMES R. HENSLEY, a citizen of the United States, residing at Portland, in the county of Multnomah and State of Oregon, have invented certain new and useful Improvements in Fuel-Mixers; and I do declare the following to be a full, clear, and exact description of the invention, such as will enable others skilled in the art to which it appertains to make and use the same.

This invention relates to improvements in fuel mixers.

The principal object of the invention is to provide a device of the above mentioned character which may readily be secured in the intake pipe of an automobile engine which will thoroughly mix or break up the particles of fuel upon which the device is acting, whereby a more intimate and complete mixture of the fuel is obtained.

Another object of the invention is to provide a device of the above mentioned type which is simple in construction, strong, durable and inexpensive to manufacture.

Other objects and advantages of the invention will be apparent during the course of the following description.

In the accompanying drawings forming a part of this specification and in which like numerals are employed to designate like parts throughout the same, Figure 1 is a central longitudinal sectional view of a device constructed in accordance with my invention.

Fig. 2 is a detached top or plan view of the mixer.

In the drawings, wherein for the purpose of illustration is shown a preferred embodiment of my invention, the numeral 1 indicates, as a whole, an intake pipe of the usual or well known construction which includes annular flanges 2 between which my mixer is secured and held.

My mixer comprises a stationary support and a rotatable member or paddle wheel which is mounted thereon. The supporting element in this instance comprises a stamped metal plate 3 which is provided with openings 4 near its ends through which the bolts 5 pass and thus secure the plate in the desired position and hold it in such position when the nuts 6 are tightened thereon. The central portion of the plate is open, as shown, and is spanned by an outwardly bent perforated supporting strip or arm 7.

Extending through the strip 7 is a bolt or spindle 8, which by preference is formed with a head 9 on one end and threaded at its opposite end to receive a nut 10 which holds the parts in their assembled position.

Rigidly secured to the strip member 7 is a bearing sleeve 12 through which extends the spindle 8 which serves to keep the spindle 8 from sagging, etc. The spindle is also surrounded by a hub 11 which is provided with a reduced neck port portion the same being designed to be received within a central opening in the fan 13, the fan being held in place by a washer 14. The said washer is held in place by a rounded head which is formed on the reduced end of the hub as shown. It is obvious that the fan 13 and washer 14 will necessarily be placed in position before the rounded head is formed. I also employ a second washer 15 on the reduced end of the sleeve 12 as an additional means for holding the parts together. It will be seen that by making the head of the hub 11 round and thereby reducing the amount of friction and point of bearing between itself and the member 12 free rotation of the fan 13 will be permitted.

The fan 13 is preferably constructed from a single sheet of metal and has a series of integral longitudinally split blades of different widths and pitches. The wide blades 16 have their greatest surfaces disposed obliquely to the axis of rotation of the fan and these wide blades propel or drive the fan. By greatest surfaces it is to be understood that I mean the widest portions of the blades. The narrow blades 17 are bent away from the wider blade and have their greatest surfaces or free ends disposed parallel to the axis of rotation, these blades serving to break or cut up the particles of air and gas and thus cause a complete mixture thereof, which is desirable.

It will be seen that all the parts of my mixer are simple in construction and are easily and readily removable, and cause the particles of air and gas to mix thoroughly because of the peculiar arrangement of the fan blades.

It is to be understood that the form of my invention herein shown and described is to be taken as a preferred embodiment of the same, and that various changes in the shape, size and arrangement of parts may be resorted to without departing from the spirit of the invention or the scope of the subjoined claim.

Having thus described my invention, what I claim is:—

In a device of the type specified, a rotatable member to be placed in the intake pipe of a gas engine comprising a fan or paddle wheel constructed of a single sheet of metal having its periphery formed with radial notches thus forming blades, the latter being split longitudinally or in a radial direction from their extremities inwardly to a point adjacent the hub to form relatively wide and narrow blade portions, the said wide blade portions being positioned between the narrow blade portions and being twisted to dispose their greatest surfaces obliquely to the axis of rotation, whereby when the current of air gas contacts with their under faces, the fan will be caused to spin and the narrow blade portions being twisted away from the wide blade portions and disposed in planes parallel to the axis of the fan, said narrow blade being adapted to break up the charge, substantially as described.

In testimony whereof I have hereunto set my hand.

JAMES ROBERT HENSLEY.